(No Model.)
P. R. HOUPE.
COTTON PLANTER AND FERTILIZER DISTRIBUTER.
No. 301,447. Patented July 1, 1884.
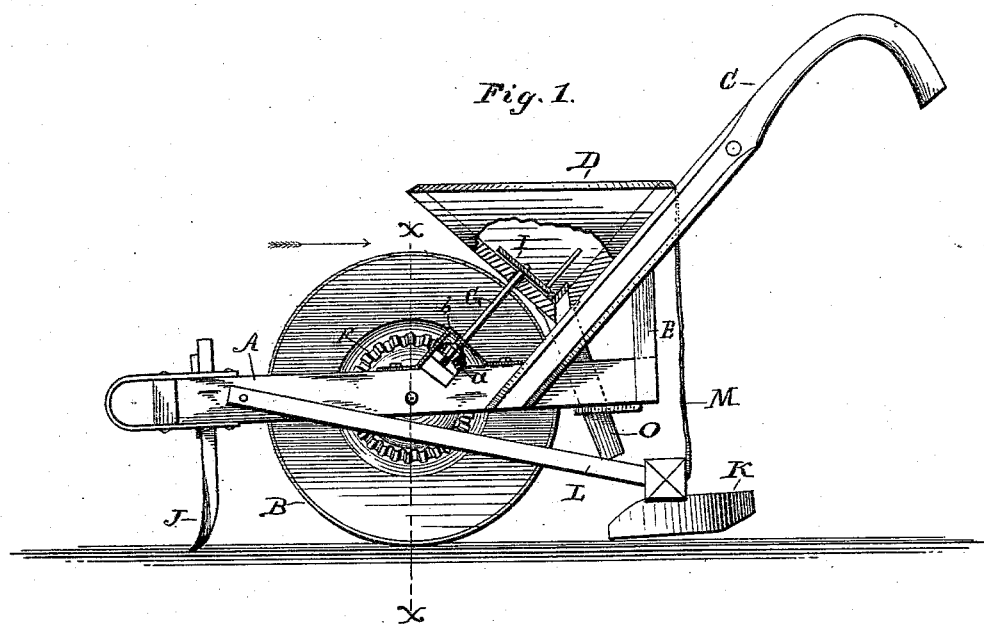
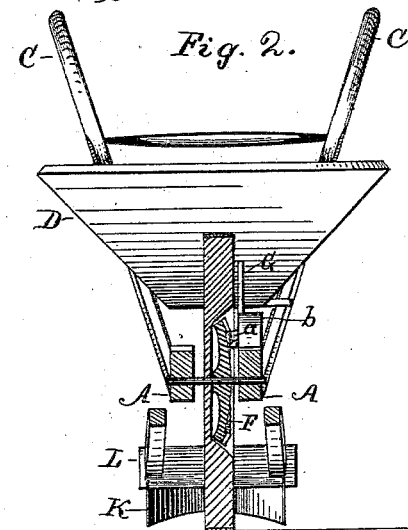
WITNESSES:
Thos Houghton.
Edw. A. Byrn.
INVENTOR:
P. R. Houpe
BY
ATTORNEYS.

UNITED STATES PATENT OFFICE.

PLEASANT ROCKWELL HOUPE, OF OAK FOREST, NORTH CAROLINA.

COTTON-PLANTER AND FERTILIZER-DISTRIBUTER.

SPECIFICATION forming part of Letters Patent No. 301,447, dated July 1, 1884.

Application filed August 10, 1882. Renewed October 12, 1883. (No model.)

*To all whom it may concern:*

Be it known that I, PLEASANT ROCKWELL HOUPE, of Oak Forest, in the county of Iredell and State of North Carolina, have invented a new and useful Improvement in Cotton-Planters and Fertilizer-Distributers; and I do hereby declare that the following is a full, clear, and exact description of the same, reference being had to the accompanying drawings, forming part of this specification, in which—

Figure 1 is a side elevation with the seed-box partly in section; and Fig. 2 is a vertical cross-section through the line $x\ x$ of Fig. 1, looking in the direction of the arrow.

My invention consists of an improved cotton-seed planter and fertilizer-distributer of that general form in which a stirrer within the hopper is actuated through an inclined shaft driven by a bevel-gear on the front wheel, and in which the seed are covered by a drag trailing behind the planter.

My improvements will be fully described hereinafter.

In the drawings, A represents the main frame, composed of two parallel bars fastened together on the front and rear, and having arranged between them, on a suitable axis, a driving and running wheel, B.

C C are the two handles, which project upwardly to the rear and support the seed-box D, which is formed with inclined sides like a hopper, and is fastened securely to said handles, which handles are in turn braced and supported by bars E, extending upwardly from the main frame. Upon one side of the running and driving wheel is formed a circular central recess, in which is placed a bevel-gear wheel, F, which is firmly secured to said wheel, so as to revolve with it. The recess formed on the side of said wheel is sufficiently deep to completely house the bevel-wheel F, so that its teeth are entirely inside the plane of the side of said wheel.

G is a shaft having its lower end journaled in a box in the main frame, and its upper end supported and turning in the front wall of the seed-box. This shaft has at its lower end a bevel-pinion, $a$, which engages with the teeth of the gear-wheel F and is covered by a plate, $b$, to keep the dirt out of its teeth. The shaft G inclines upwardly to the rear at about the same inclination as the handles, and its rear end, that passes through the inside of the seed-box, being at right angles to the side of said box, is provided with a stirrer or spiked wheel, I, that revolves in parallel position to the side of the box, with its teeth close to an opening in the bottom of the box, through which the seed or fertilizer is discharged. This opening, as usual, has an adjustable slide to regulate its size and determine the amount of seed or fertilizer to be discharged through the spout O.

In the front part of the main frame is fixed an opener-tooth, J, while in the rear is a coverer, K, that covers the seed or manure in the opening formed by the tooth in front. This coverer is made in the form of a U-shaped metal plate, with its two ends in advance and its bent portion to the rear. Said plate is attached to the rear end of a dragging-frame, L, whose forward ends are hinged or jointed to the front portion of the main frame, and whose rear end may be raised or lowered at will by means of a strap, M.

I am aware of the patent to Foster, March 31, 1874. My invention differs therefrom in the fact that the hopper is made with inclined angular sides, one of whose sides is bolted flat against the inclined handles, which form a support for the hopper, whose other side is brought into right-angular relation to the stirrer-shaft, whose stirrer is thereby enabled to revolve flat against that side close to the opening at the bottom.

My invention is also distinctive in the fact that the gear F is let into the wheel B, and that the lower end of the stirrer-shaft is journaled in one of the side bars of the frame, and has its gear-wheel covered by a housing-plate, $b$, which arrangement excludes dirt from the gear.

Having thus described my invention, what I claim as new is—

1. The combination of the frame A, composed of parallel bars, the running-wheel B, having gear-wheel F let into its side, the inclined shaft G, journaled at its lower end in frame A, and having pinion $a$ at its lower end, with housing-plate *b*, and a stirrer, I, at its upper end, the inclined handles C C, and the fertilizer-box D, formed with inclined angular sides, the rear side of which rests directly upon and is supported flat against the handles, while the front side is brought at right angles to and forms a bearing for the inclined shaft, as set forth.

2. The combination of the main frame A, the running-wheel B, with its gear F set inside the plane of the running-wheel, and the inclined stirrer-shaft G, having pinion *a*, and journaled at right angles to the front side of the fertilizer-box, as shown and described.

PLEASANT ROCKWELL HOUPE.

Witnesses:
 JAS. F. ANDERSON,
 W. W. MOTT.